Oct. 15, 1957  J. C. WITT  2,809,541
OBSTRUCTION DETECTOR FOR HEADING MACHINE
Filed Nov. 16, 1953
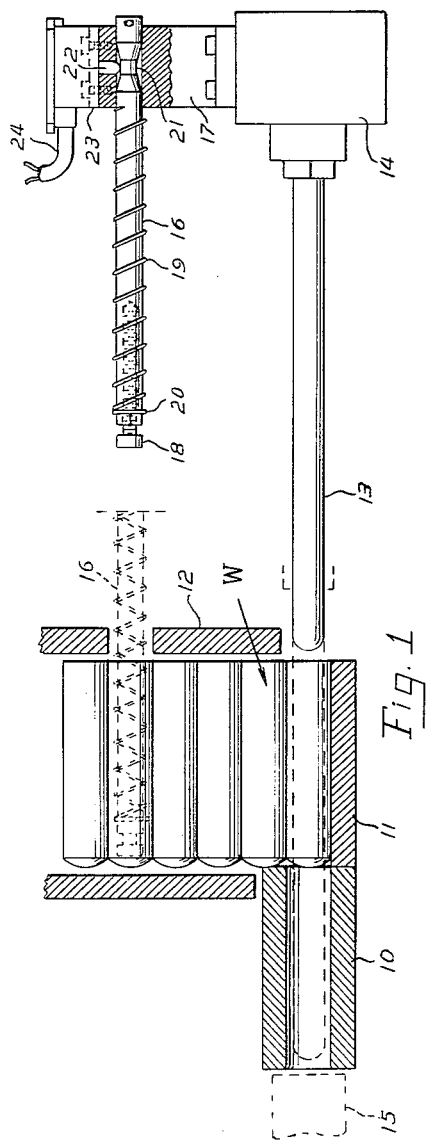
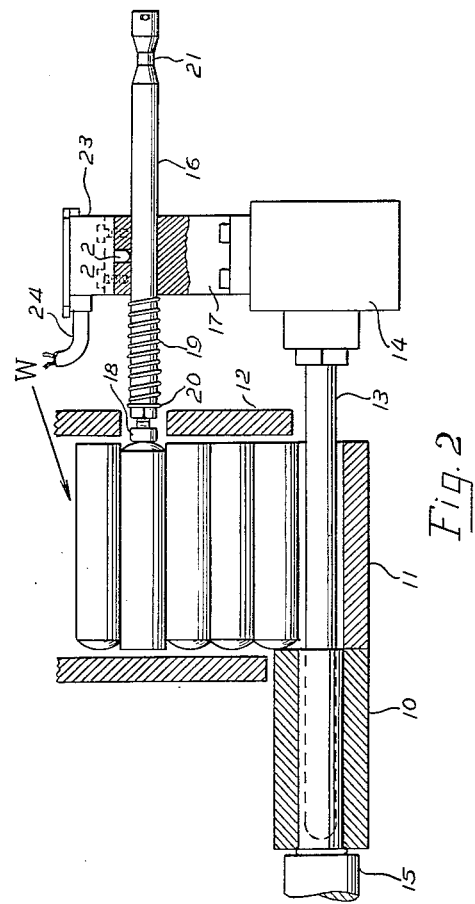
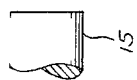
INVENTOR
JACK C. WITT
BY
John H Lewis Jr.
ATTORNEY

United States Patent Office 2,809,541
Patented Oct. 15, 1957

2,809,541

OBSTRUCTION DETECTOR FOR HEADING MACHINE

Jack C. Witt, Independence, Mo., assignor to Remington Arms Company, Inc., Bridgeport, Conn., a corporation of Delaware Application November 16, 1953, Serial No. 392,244

3 Claims. (Cl. 78—17)

This invention relates to a control device for a machine in which numerous workpieces are fed in rapid succession to forming or other tools.

More specifically, the invention relates to machines of the type which perform a heading or comparable operation on a tubular workpiece, such as a cartridge case in process of manufacture, and contemplates effective devices for detecting a defective or improperly positioned workpiece in transit to the working tools, and for stopping the machine to prevent a jam or smash-up by the engagement of tools with an improperly disposed or defective workpiece.

In the drawings:

Fig. 1 is a somewhat diagrammatic fragmentary elevation, partly in section, showing only the part of the machine with which the invention is associated.

Fig. 2 is a fragmentary elevation, partly in section, showing the detector device displaced by engagement with an improperly positioned workpiece.

For a more complete disclosure of a machine of the type to which the invention is applicable, reference is made to the patent to McCoy et al., No. 2,398,320, April 9, 1946. The machine shown in said patent, as well as the machine to which the present invention has been applied, is designed to form a flat head upon the closed end of a workpiece, such as a cartridge case in process of manufacture, which case is delivered from the drawing tools with a curving or domed head. This operation is performed in a die 10 having associated therewith and in line with the die aperture a trough 11 to which workpieces W are delivered from a feed magazine 12, in which magazine the workpieces lie in side-by-side relation. Each workpiece in turn is moved from trough 11 into die 10 by the engagement therein of a heading stem 13 which projects from a reciprocating cross-head 14, the stem being adapted to enter a workpiece from the mouth end, engage the inside of the workpiece head, and thrust the workpiece into and through die 10 to a position such that the domed head of the workpiece projects a short distance from the opposite end of the die. Operating in synchronism with the heading stem 13 is a reciprocating heading bunter 15 which advances toward and engages the projecting dome head to deform and flatten it, as illustrated in Fig. 1. The heading bunter may carry any desired indicia to be impressed in the flattened head. Fig. 1 shows the retracted positions of heading stem 13 and heading bunter 15 in full lines, and their advanced positions in broken lines. The heading stem, being advanced, forms a support for the stacked workpieces in the magazine 12, the lowermost workpiece dropping into position in trough 11 in front of the stem as the stem is retracted. The next advance of the heading stem again thrusts the workpiece in trough 11 into die 10, and this workpiece serves to eject the headed piece already in die 10, the timing of the movement of bunter 15 with respect to stem 13 being such as to enable this ejection.

The heading of the cases of relatively large cartridges, say 50 or 60 caliber, involves the displacement of a substantial amount of metal, requiring the application of considerable power to the heading stem and bunter, respectively. If a workpiece is presented between these tools in an inverted position or is obstructed, dented, bent or otherwise deformed, so that the heading stem cannot fully enter it, the least damage done is a jam which requires considerable time to clear, while the damage may extend to smash-ups of tools and/or dies. The present invention contemplates a device for detecting a workpiece which is inverted so that its head end, rather than its mouth end, is presented to the heading stem, or a workpiece which is so obstructed, either by being deformed or by containing foreign matter, that the heading stem cannot properly enter it; and devices under control of the detector to stop the operation of the machine and permit the removal of the defective or misplaced workpiece before any damage is done to the machine.

The detector comprises a rod or stem 16 slidably mounted in parallel relationship to heading stem 13 in a block 17 secured to the reciprocating cross-head 14, so that detector rod 16 and heading stem 13 move in unison. Detector rod 16 may be provided with an adjustable head 18 to accommodate workpieces of varying length. Said rod slides freely in an aperture in block 17 and is urged outward and toward magazine 12 by suitable means, such as a spring 19 embracing the rod and compressed between the side of block 17 and a collar 20 on the rod. The portion of detector rod 16 within the block 17 comprises a cut-out 21 adapted to receive a switch operating plunger 22 of a micro-switch 23 secured to block 17. Electrical conductors housed in a flexible tube 24 connect micro-switch 23 to the usual machine starting and stopping control boxes, the arrangement being such that current supply to the machine driving motor is cut off whenever switch operator 22 is inwardly displaced.

Detector rod 16 is so positioned, laterally and transversely, as to stand opposite one of the workpieces W in magazine 12. Fig. 1 shows the retracted position of detector 16 as well as heading stem 13 in full lines and the normal advanced position of detector 16 in broken lines. In its broken line position the detector has not moved relative to switch operator 22, and the machine continues to operate. However, any obstruction which stops the advance of detector 16 in unison with heading stem 13 causes mounting block 17 to slide over the detector stem, compressing spring 19 and displacing switch operator 22 out of cut-out 21, thus activating switch 23 to stop the machine. This condition is illustrated in Fig. 2, in which the detector has engaged the head of an inverted workpiece. It will be obvious that the same effect is produced if the detector is stopped at any time after it enters a workpiece, either by the presence of foreign matter inside the workpiece or by a material deformation of the workpiece itself.

What is claimed is:

1. In apparatus for performing heading and like operations in which tubular workpieces having one closed end are sequentially inserted closed end first in a workpiece receiving die, the combination comprising a tubular workpiece receiving die, a workpiece trough disposed in alignment with said die, a magazine for workpieces in side-by-side relation, disposed for sidewise delivery of individual workpieces to said trough, said magazine having a wall opening axial to said workpieces, means for transferring a workpiece from said trough into said die comprising a reciprocating tool support and a workpiece engaging tool mounted thereon in alignment with said trough, and means for detecting an inverted workpiece in said magazine comprising a rod-like element mounted on said tool support for axial displacement, spring means urging said element to an extended position towards said magazine wall opening, and machine control means disposed on said tool support for actuation by said element in displacement from an extended position, said element being disposed to enter the open end of workpieces in said magazine without displacement from extended position and to be displaced by engagement with the closed end of an inverted workpiece.

2. Apparatus according to claim 1, in which said machine controlling device is a micro-switch comprising an operator adapted to be actuated when said detector is displaced relative to said support by an abnormal workpiece.

3. Apparatus according to claim 2, in which said rod-like element comprises a cut-out adapted to receive said switch operator when said detector is in normal extended position.

References Cited in the file of this patent

UNITED STATES PATENTS

| | | |
|---|---|---|
| 135,763 | Bradford | Feb. 11, 1873 |
| 1,360,410 | Jones | Nov. 30, 1920 |
| 1,555,596 | Miller | Sept. 29, 1925 |
| 1,683,661 | Felding | Sept. 11, 1928 |
| 2,274,583 | Baum | Feb. 24, 1942 |
| 2,348,644 | Preziosi | May 9, 1944 |
| 2,366,960 | England | Jan. 9, 1945 |
| 2,373,582 | Kuehl | Apr. 10, 1945 |
| 2,398,320 | McCoy et al. | Apr. 9, 1946 |
| 2,425,438 | O'Neal | Aug. 12, 1947 |
| 2,464,830 | Shellem et al. | Mar. 22, 1949 |
| 2,493,868 | Griffin | Jan. 10, 1950 |
| 2,499,564 | Binsack | Mar. 7, 1950 |
| 2,542,988 | Bureau | Feb. 27, 1951 |